US009007172B2

(12) United States Patent
Kukoyi

(10) Patent No.: US 9,007,172 B2
(45) Date of Patent: Apr. 14, 2015

(54) SMART KEY CARD

(71) Applicant: Verizon Patent and Licensing Inc., Basking Ridge, NJ (US)

(72) Inventor: Dolapo O. Kukoyi, Irving, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 132 days.

(21) Appl. No.: 13/724,767

(22) Filed: Dec. 21, 2012

(65) Prior Publication Data

US 2014/0176302 A1 Jun. 26, 2014

(51) Int. Cl.
*G05B 23/00* (2006.01)
*G07C 9/00* (2006.01)

(52) U.S. Cl.
CPC .................................. *G07C 9/00904* (2013.01)

(58) Field of Classification Search
CPC ..................................................... H04W 12/00
USPC ........................................... 340/5.6, 10.1, 3.1
See application file for complete search history.

(56) References Cited

U.S. PATENT DOCUMENTS

| | | | | |
|---|---|---|---|---|
| 6,999,936 | B2 * | 2/2006 | Sehr | 705/5 |
| 2005/0051620 | A1 * | 3/2005 | DiLuoffo et al. | 235/382 |
| 2012/0190402 | A1 * | 7/2012 | Whang et al. | 455/552.1 |

* cited by examiner

*Primary Examiner* — Vernal Brown

(57) ABSTRACT

A key card device may include a memory device storing a digital signature for activating a lock, an input device, an output device, and a wireless transceiver. The key card device may further include logic configured to receive input via the input device; generate a first message based on the received input; wirelessly transmit the generated message to facility management system associated with the lock; receive a second message from the facility management system; generate output based on the received second message; and provide the generated output to the output device.

17 Claims, 13 Drawing Sheets

SMART KEY CARD

BACKGROUND INFORMATION

Key cards may be used to control access to a facility. For example, a hotel guest may book a hotel room and the hotel staff may provide the hotel guest with a key card. The key card may be configured to open the lock on the guest's hotel room and may not be able to open any other rooms in the hotel. As another example, an office building may include locks on doors and elevators. A worker in the office may be given a key card configured to open particular doors and/or to enable an elevator to stop on a particular floor. A key card may use a bar code, a magnetic stripe, a radio frequency identification tag, and/or another method to store a code that may be used to match a code in a lock in order to open the lock.

DETAILED DESCRIPTION OF PREFERRED EMBODIMENTS

The following detailed description refers to the accompanying drawings. The same reference numbers in different drawings identify the same or similar elements.

An implementation described herein relates to a smart key card. A smart key card may correspond to a key card that enables a user to interact with a facility management system. The facility management system may be associated with a facility that includes a lock associated with the smart key card. The smart key card may allow a user to access a room at the facility (e.g., a hotel room). In some implementations, the smart key card may include a wireless transceiver configured to communicate with the facility management system, may include an input device for receiving user input, and/or may include an output device for providing output to the user. For example, the smart key card may include a keyboard for entering alphanumeric characters and a liquid crystal display (LCD) for display alphanumeric characters. Furthermore, the smart key card may store a list of requests. The user may select a request from the list of requests and the selected request may be sent, via the wireless transceiver, to the facility management system and/or to other devices.

In other implementations, the smart key card may not include an input device and/or an output device and may include a wireless transceiver for communicating with a mobile communication device. For example, the smart key card may include a Bluetooth transceiver and/or a near field communication (NFC) transceiver. When the smart key card becomes activated by the facility management system, the smart key card may identify a mobile communication device associated with a user of the smart key card and may install a key card application on the mobile communication device. The key card application may generate a user interface to enable the user to send requests to the facility management system and/or other devices and to receive messages from the facility management system and/or the other devices. The key card application may need to authorize a request with the smart key card before transmitting the request and/or may need to authorize a message with the smart key card before providing the message to the user via the user interface. When the smart key card is deactivated, the smart key card may instruct the mobile communication device to uninstall the key card application.

Figure 1:
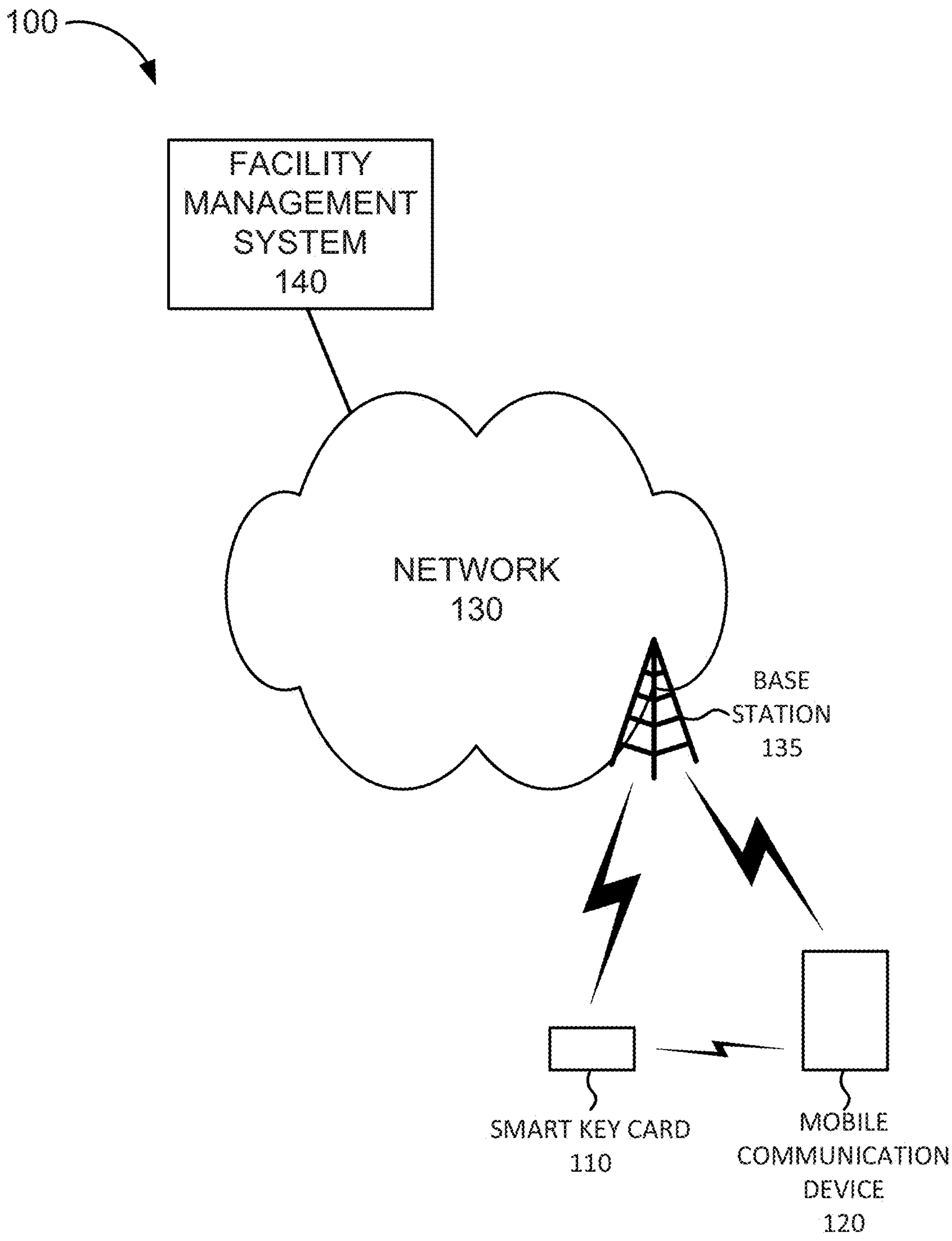
FIG. 1 is a diagram illustrating an exemplary environment according to an implementation described herein.

FIG. 1 is a diagram illustrating an exemplary environment 100 according to an implementation described herein. As shown in FIG. 1, environment 100 may include a smart key card 110, a mobile communication device 120, a network 130, and a facility management system 140. While a single smart key card 110, a single mobile communication device 120, a single network 130, and a single facility management system 140 are shown in FIG. 1 for illustrative purposes, in practice, environment 100 may include multiple smart key cards 110, multiple mobile communication devices 120, multiple networks 130, and/or multiple facility management systems 140.

Smart key card 110 may include a key card that includes a memory device that stores a digital signature to activate a lock or another type of access mechanism. For example, the memory device may include a magnetic strip, a bar code, a radio frequency identification (RFID) tag, and/or another type of digital signature. Furthermore, smart key card 110 may include wireless communication functionality. For example, smart key 110 may include a wireless transceiver to communicate with facility management system 140 and/or with mobile communication device 120.

In some implementations, smart key card 110 may correspond to a standard ID-1 card size (e.g., 85.60 millimeters (mm) by 53.98 mm) or may include dimensions that are about the size of a standard ID-1 card size (e.g., within 10 percent of the dimensions of a standard ID-1 card size). In other implementations, smart key card 110 may correspond to a standard ID-2 card size (e.g., 105 mm by 74 mm), a standard ID-3 card size (e.g., 125 mm by 88 mm), or another card size standard. In still other implementations, smart key card 110 may include a different set of dimensions.

Mobile communication device 120 may include any device capable of communicating with smart key card 110 and/or facility management system 140. For example, mobile communication device 110 may include a mobile phone, a smart phone, a tablet computer, a laptop computer, a personal digital assistant (PDA), or another type of portable communication device. Mobile communication device 120 may include a key card application to process request the user sends to facility management system 140, and/or to other devices associated with facility management system 140.

Network 130 may enable smart key card 110, mobile communication device 120, and/or facility management system 140 to communicate with each other. Network 130 may include one or more wired and/or wireless networks. For example, network 130 may include a cellular network, the Public Land Mobile Network (PLMN), a second generation (2G) network, a third generation (3G) network, a fourth generation (4G) network (e.g., a long term evolution (LTE) network), a fifth generation (5G) network, a code division multiple access (CDMA) network, a global system for mobile communications (GSM) network, a general packet radio services (GPRS) network, a combination of the above networks, and/or another type of wireless network. Additionally, or alternatively, network 130 may include a local area network (LAN), a wide area network (WAN), a metropolitan area network (MAN), an ad hoc network, an intranet, the Internet, a fiber optic-based network (e.g., a fiber optic service network), a satellite network, a television network, and/or a combination of these or other types of networks. Network 130 may include base station 135. Base station 135 may send wireless signals to smart key card 110 and/or mobile communication device 120 and may receive wireless signals from smart key card 110 and/or mobile communication device 120.

Facility management system 140 may include one or more devices, such as server devices, which control services associated with a facility that includes one or more locks controlled by smart key card 110. Facility management system 140 may process requests received from smart key card 110 and/or received from mobile communication device 120. Furthermore, facility management system 140 may send message to the user via smart key card 110 and/or via mobile communication device 120.

As an example, facility management system 140 may correspond to a hotel management system, associated with a hotel, and smart key card 110 may correspond to a key card for room in the hotel. As another example, facility management system 140 may correspond to office building management system, associated with an office building, and smart key card 110 may correspond to a key card for an entrance to the building and/or for an elevator in the building. As yet another example, facility management system 140 may correspond to a conference center management system, associated with a conference center, and smart key card 110 may correspond to a key card for a room in the conference center.

Although FIG. 1 show exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2A:
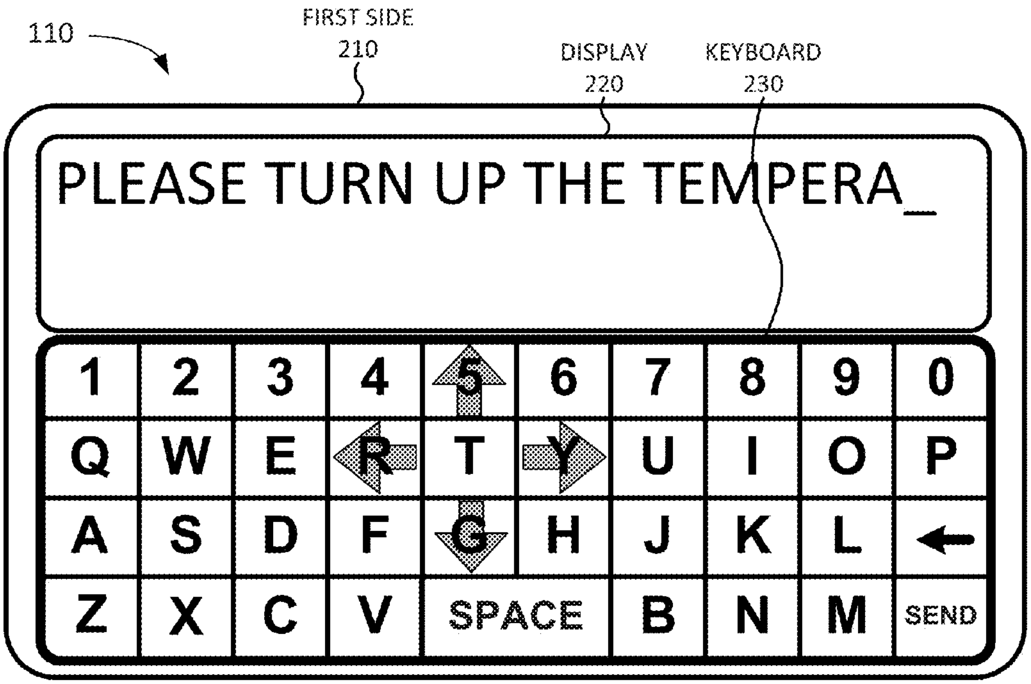
FIGS. 2A and 2B are a diagram illustrating an exemplary implementation of the smart key card of FIG. 1.
Figure 2B:
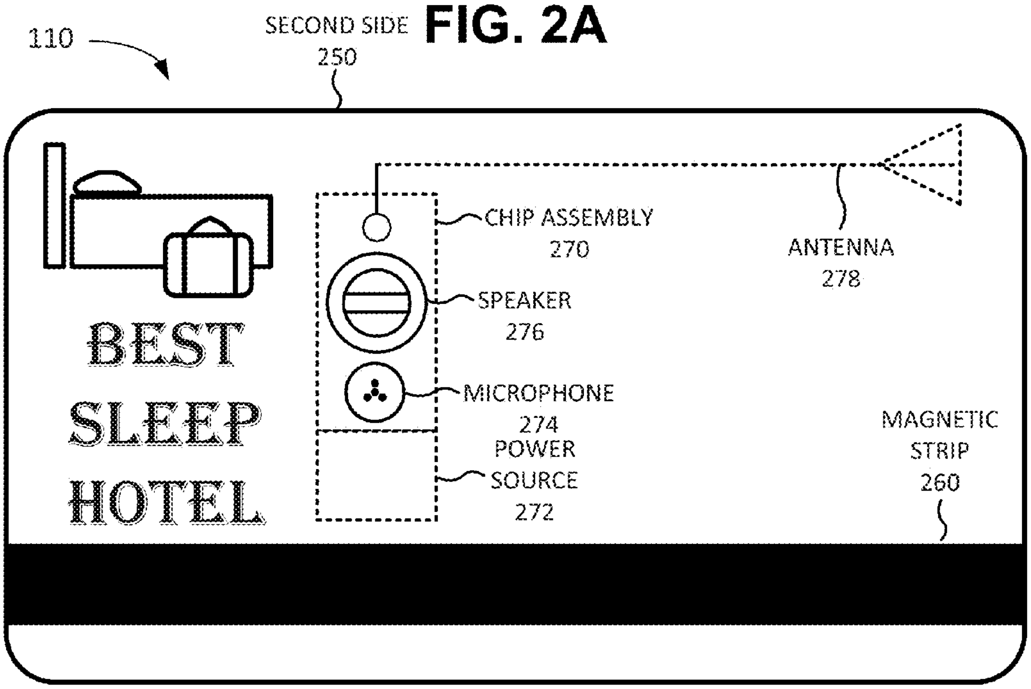

FIGS. 2A and 2B are diagrams illustrating an exemplary implementation of smart key card 110. In some implementations, smart key card 110 may be formed from a plastic material. In other implementations, smart key card 110 may be formed from a different type of material (e.g., a metal material, a composite of plastic and metal, etc.). FIG. 2A shows a first side 210 of smart key card 110. As shown in FIG. 2A, first side 210 of smart key card 110 may include a display 220 and a keyboard 230. In some implementations, display 220 may include a liquid crystal display (LCD) configured to display one or more lines of alphanumeric characters. In other implementations, display 220 may include a different type of display, such as an electronic ink display, an electroluminescent display, and/or another type of display. Keyboard 230 may include a set of alphanumeric keys configured to enable a user to enter alphanumeric characters. Furthermore, keyboard 230 may include a set of arrow keys configured to enable to user to move a cursor across display 220. In some implementations, keyboard 230 may include a full keyboard. In other implementations, keyboard 230 may include a reduced keyboard in which particular keys may represent multiple characters and in which a particular character may be selected using a combination of key presses. In yet other implementations, display 220 and keyboard 230 may be replaced by a touch screen or another type of combined input/output device.

FIG. 2B shows a second side 250 of smart key card 110. As shown in FIG. 2B, second side 250 of smart key card 110 may include a magnetic strip 260 and a chip assembly 270. Magnetic strip 260 may store a digital signature configured to activate a lock or another type of access mechanism. In other implementations, smart key card 110 may include a different type of memory device to store a digital signature configured to activate a lock, such as a bar code or an RFID tag.

Chip assembly 270 may include one or more integrated circuit (IC) devices configured to perform the functionality of smart key card 110. Chip assembly 270 may include a wireless transceiver. For example, chip assembly 270 may include processing logic configured to obtain input via keyboard 230, display the obtained input in display 220, generate wireless signals based on the obtained input using the wireless transceiver, and transmit the wireless signals. Furthermore, chip assembly 270 may receive wireless signals, may generate output based on the received wireless signals, and may display the generated output in display 220. Chip assembly 270 may be molded into the plastic of smart key card 110 and may not be visible to the user, as indicated by the dashed lines in FIG. 2B.

Chip assembly 270 may include a power source 272, a microphone 274, a speaker 276, and an antenna 278. Power source 272 may include one or more batteries to supply electrical power to chip assembly 270. Microphone 274 may be configured to receive audio input and to convert the received audio input into electrical signals. Speaker 276 may be configured to generate audio signals based on electrical signals generated by chip assembly 270. Antenna 278 may be configured to send wireless signals and/or to receive wireless signals.

Although FIGS. 2A and 2B show exemplary components of smart key card 110, in other implementations, smart key card 110 may include fewer components, different components, differently arranged components, or additional components than depicted in FIG. 2. Additionally or alternatively, one or more components of smart key card 110 may perform functions described as being performed by one or more other components of target device 120.

As an example, in some implementations, smart key card 270 may not include microphone 274 and speaker 276. Thus, a user may be able to communicate with facility management system 140 using text messages generated with keyboard 230 and may receive text messages that may be displayed in display 220, but may not be able to send or receive audio signals.

As another example, in yet other implementations, smart key card 110 may not include display 220 and/or keyboard 230 and chip assembly 270 may not include microphone 274 and speaker 276. Thus, in such implementations, the user may not be able to use smart key card 110 to send or receive messages. Rather, chip assembly 270 may include a wireless transceiver configured to communicate with mobile communication device 120 (e.g., using a Bluetooth connection, an NFC connection, etc.) and may communicate with mobile communication device 120 to install a key card application. Thus, the user may send requests to facility management system 140 and the key card application may communicate with smart key card 110 to authenticate and authorize messages between mobile communication device 120 and facility management system 140 and/or other devices.

Figure 3:
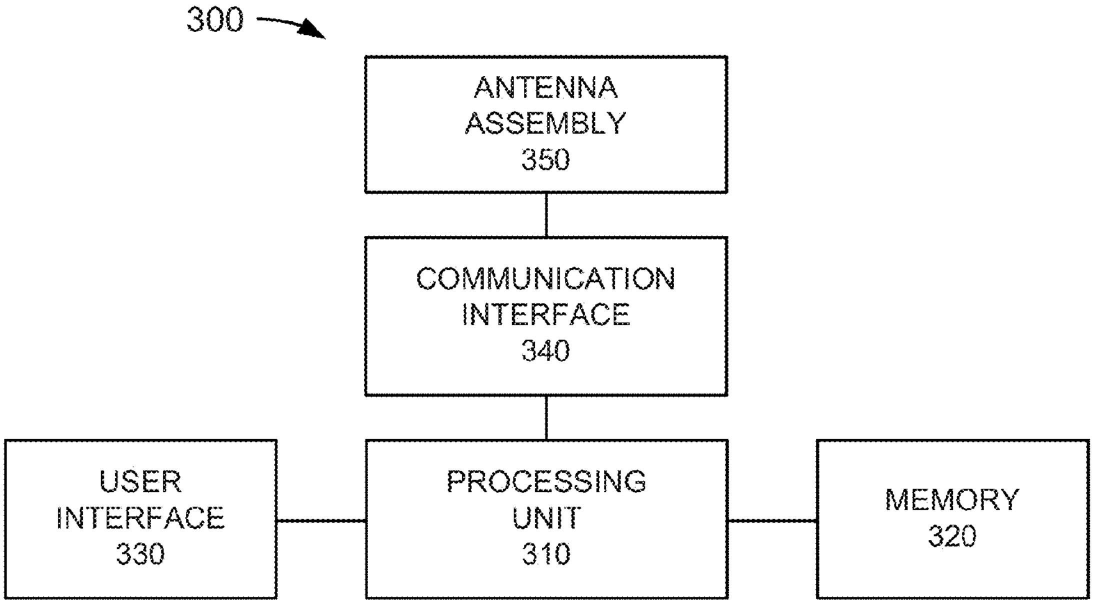
FIG. 3 is a diagram illustrating exemplary components of a device that may be included in the smart key card or the mobile communication device of FIG. 1.

FIG. 3 is a diagram illustrating example components of a device 300 according to an implementation described herein. Smart key card 110 and mobile communication device 120 may each include device 300. As shown in FIG. 3, device 300 may include a processing unit 310, a memory 320, a user interface 330, a communication interface 340, and an antenna assembly 350.

Processing unit 310 may include one or more processors, microprocessors, application specific integrated circuits (ASICs), field programmable gate arrays (FPGAs), or other processing logic. Processing unit 310 may control operation of device 300 and its components.

Memory 320 may include a random access memory (RAM) or another type of dynamic storage device, a read only memory (ROM) or another type of static storage device, a removable memory card, and/or another type of memory to store data and instructions that may be used by processing unit 310.

User interface 330 may include mechanisms for inputting information to device 300 and/or for outputting information from device 300. Examples of input and output mechanisms might include a speaker to receive electrical signals and output audio signals (e.g., speaker 276); a camera lens to receive image and/or video signals and output electrical signals; a microphone to receive audio signals and output electrical signals (e.g., microphone 274); buttons (e.g., a joystick, control buttons, a keyboard, or keys of a keypad) and/or a touchscreen to permit data and control commands to be input into device 300 (e.g., keyboard 230); a display, such as an LCD, to output visual information (e.g., display 220); a vibrator to cause device 300 to vibrate; and/or any other type of input or output device.

Communication interface 340 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 340 may include a transmitter that converts baseband signals to radio frequency (RF) signals and/or a receiver that converts RF signals to baseband signals. Communication interface 340 may be coupled to antenna assembly 350 for transmitting and receiving RF signals.

Communication interface 340 may include a logical component that includes input and/or output ports, input and/or output systems, and/or other input and output components that facilitate the transmission of data to other devices. For example, communication interface 340 may include a network interface card (e.g., Ethernet card) for wired communications and/or a wireless network interface (e.g., a WiFi) card for wireless communications. Communication interface 340 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

Antenna assembly 350 may include one or more antennas (e.g., antenna 278) to transmit and/or receive RF signals over the air. Antenna assembly 350 may, for example, receive RF signals from communication interface 340 and transmit the signals over the air and receive RF signals over the air and provide them to communication interface 340.

As described herein, device 300 may perform certain operations in response to processing unit 310 executing software instructions contained in a computer-readable medium, such as memory 320. A computer-readable medium may be defined as a non-transitory memory device. A memory device may include memory space within a single physical memory device or spread across multiple physical memory devices. The software instructions may be read into memory 320 from another computer-readable medium or from another device via communication interface 340. The software instructions contained in memory 320 may cause processing unit 310 to perform processes that will be described later. Alternatively, hardwired circuitry may be used in place of, or in combination with, software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, or additional components than depicted in FIG. 3. Additionally or alternatively, one or more components of device 300 may perform the tasks described as being performed by one or more other components of device 300.

Figure 4:
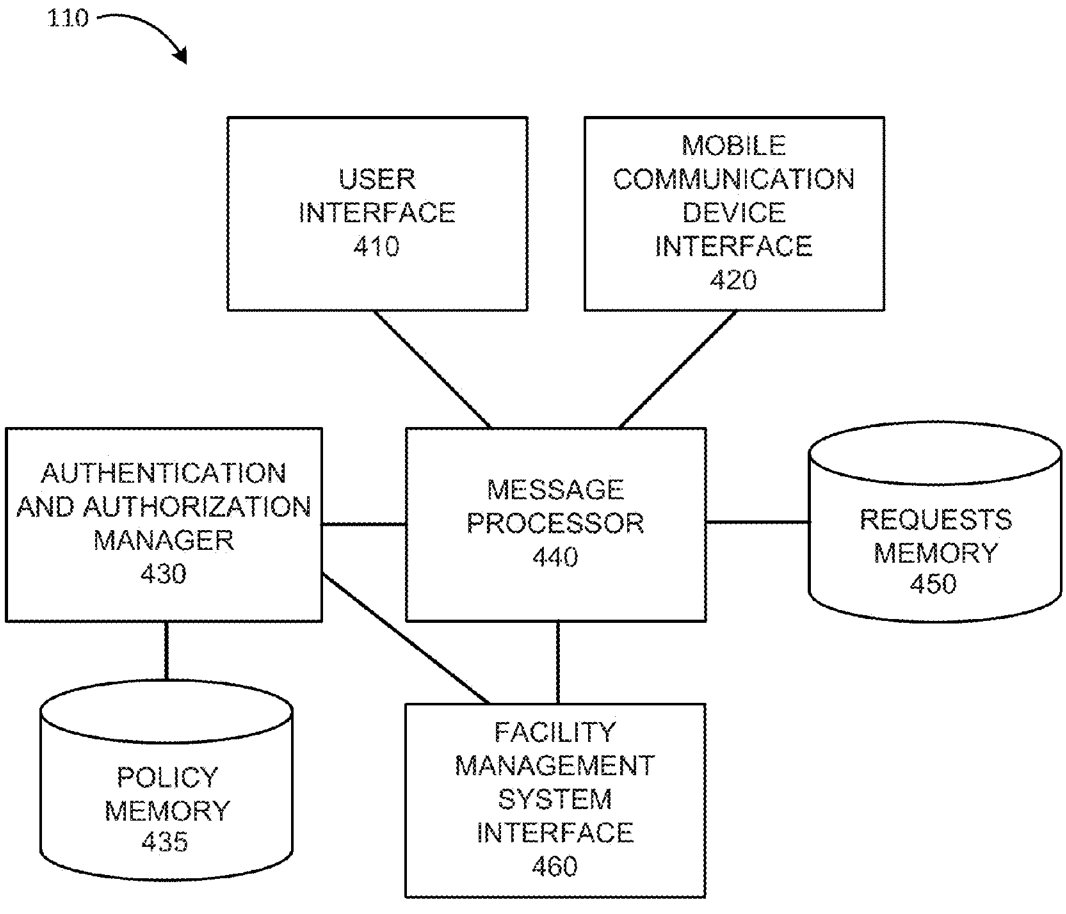
FIG. 4 is a diagram illustrating exemplary functional components of the smart key card of FIG. 1 according to an implementation described herein.

FIG. 4 is a diagram illustrating exemplary functional components of the smart key card 110 according to an implementation described herein. The functional components of smart key card 110 may be implemented, for example, via processing unit 310 executing instructions from memory 320. Alternatively, some or all of the functional components of smart key card 110 may be implemented via hard-wired circuitry. As shown in FIG. 4, smart key card 110 may include a user interface 410, a mobile communication device interface 420, an authentication and authorization manager 430, a policy memory 435, a message processor 440, a requests memory 450, and a facility management system interface 460.

User interface 410 may receive user input from keyboard 230 and/or microphone 274 and may convert the user input into a message to be processed by message processor 440. Furthermore, user interface 410 may generate user output, based on a message received by message processor 440, and may provide the user output to display 220 and/or to speaker 276.

Mobile communication device interface 420 may communicate with mobile communication device 120. For example, mobile communication device interface 420 may convert messages received by message processor 440 into wireless signals to be transmitted by antenna 278 to mobile communication device 120, and/or may receive wireless signals from mobile communication device 120 via antenna 278 and convert the wireless signals into messages to be processed by message processor 440. Mobile communication device interface 420 may include a Bluetooth wireless chipset, an NFC wireless chipset, and/or another type of chipset configured to perform short range wireless communication.

Furthermore, mobile communication device interface 420 may identify a mobile communication device 120 associated with a user of smart key card 110 and may instruct the identified mobile communication device 120 to install a key card application. In some implementations, the key card application may be stored on smart key card 110. In other applications, the key card application may be stored on a storage device associated with facility management system 140 and smart key card 110 may instruct mobile communication device 120 to access the storage device by providing a Uniform Resource Identifier (URI) to mobile communication device 120.

Authentication and authorization manager 430 may establish an authentication procedure with mobile communication device 120 and/or with facility management system 140. For example, authentication and authorization manager 430 may provide a private key to mobile communication device 120 and may use a stored public key to authenticate that a message has been received from mobile communication device 120. As another example, facility management system 140 may provide a private key to smart key card 110 and may authenticate messages received from smart key card 110 using a public key maintained by facility management system 140.

Authentication and authorization manager 430 may authenticate requests received via mobile communication device interface 420, and/or messages received via user interface 410, and may authorize the requests based on information stored in policy memory 435. Policy memory 435 may store a policy associated with smart key card 110. For example, policy memory 435 may match a particular policy to a particular set of requests and/or commands that are permitted under the particular policy.

As an example, a hotel may offer a reward program for frequent customers and the reward program may include services available via smart key card 110. For example, the reward program may include access to a concierge service via smart card 110, access to stream movies to mobile communication device 120, a discount for a particular service and/or vendor, and/or another type of service available through smart key card 110 and/or mobile communication device 120. Thus, if a user is associated with the reward program, policy memory 435 may store a list of requests associated with the services provided for the user. In some implementations, policy memory 435 may store a key card application that may be installed on mobile communication device 120.

Message processor 440 may process messages. As an example, message processor 440 may receive user input received via user interface 410, may generate a message based on the user input, may authorize the message using authentication and authorization manager 430, and may provide the message to facility management system interface 460 for transmission. As another example, message processor 440 may receive a selection of a request stored in requests memory 450 via user interface 410, may generate a message based on the selection, may authorize the message using authentication and authorization manager 430, and may provide the message to facility management system interface 460 for transmission. As yet another example, message processor 440 may receive a request to authorize a user request from mobile communication device 120, may authorize the user request using authentication and authorization manager 430, and may provide an indication that the user request has been authorized to mobile communication device 120.

Requests memory 450 may store one or more requests that may be selected by a user using user interface 410. For example, requests memory 450 may store a request to contact a person on duty associated with a facility, a request to control a device associated with smart key card 110 (e.g., a thermostat), a request to obtain particular content (e.g., a map of a conference center, a discount code, etc.), a request to contact a particular service (e.g., a concierge service, a valet service, a taxi service, etc.), a request to dial a particular phone number, and/or other types of requests.

Facility management system interface 460 may enable communication with facility management system 140. Facility management system interface 460 may convert messages received by message processor 440 into wireless signals to be transmitted by antenna 278 to facility management system 140, and/or may receive wireless signals from facility management system 140 via antenna 278 and convert the wireless signals into messages to be processed by message processor 440.

For example, facility management system interface 460 may include a wireless chipset configured to generate and/or receive wireless signals using a particular set of protocols and/or using a particular type of wireless access network. For example, facility management system interface 460 may include a Long Term Evolution wireless chipset, an enhanced high Rate Packet Data (eHRPD) wireless chipset, and/or another type of wireless chipset. As another example, facility management system interface 460 may include a WiFi chipset that enables smart key card 110 to communicate with facility management system 140 using a WiFi connection.

As another example, facility management system interface 460 may convert messages into a format associated with a particular communication service and/or may receive messages in the particular format. For example, facility management system interface 460 may convert user input into a Short Message Service (SMS) message and may send the SMS message to facility management system 140.

Facility management system interface 460 may also be used to communicate with facility management system 140 to configure smart key card 110 by, for example, activating smart key card 110, updating instructions stored by smart key card 110, updating request memory 450, updating policy memory 435, and/or by updating or changing another aspect of the functionality of smart key card 110.

Although FIG. 4 shows exemplary functional components of smart key card 110, in other implementations, smart key card 110 may include fewer functional components, different functional components, differently arranged functional components, or additional functional components than depicted in FIG. 4. Additionally or alternatively, one or more functional components of smart key card 110 may perform functions described as being performed by one or more other functional components of smart key card 110.

Figure 5:
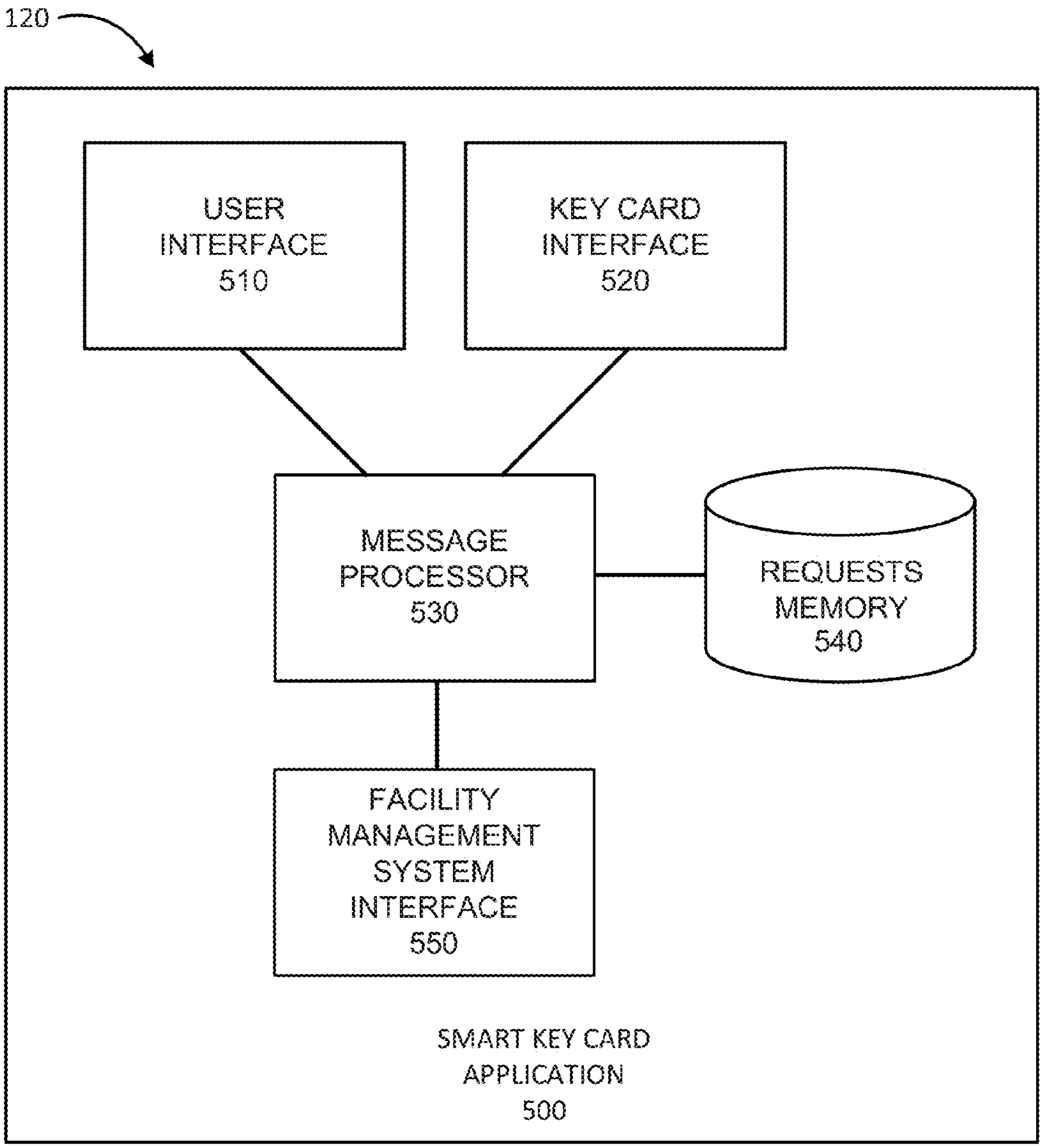
FIG. 5 is a diagram illustrating exemplary functional components of the mobile communication device of FIG. 1 according to an implementation described herein.

FIG. 5 is a diagram illustrating exemplary functional components of mobile communication device 120 according to an implementation described herein. As shown in FIG. 5, mobile communication device 120 may include a smart key card application 500. Smart key card application 500 may be installed on mobile communication device 120 in connection with smart key card 110. For example, smart key card 110 may identify mobile communication device 120 after being activated by facility management system 140 and may instruct mobile communication device 120 to install key card application 500. Key card application 500 may be stored on smart key card 110, or on a storage device associated with facility management system 140, and may be downloaded from smart key card 110 or from the storage device. When smart key card 110 becomes deactivated, smart key card 110 may instruct mobile communication device 120 to uninstall key card application 500. Smart key card application 500 may include a user interface 510, a key card interface 520, a message processor 530, a requests memory 540, and a facility management system interface 550.

User interface 510 may generate a user interface configured to enable the user of mobile communication device 120 to send requests to facility management system 140 and/or to other devices. For example, user interface 510 may generate a user interface that includes a selection object to contact a person on duty at the facility associated with facility management system 140 (e.g., a front desk of a hotel), a request to contact a device associated with smart key card 110, a request to obtain content associated with facility management system 140, a request to contact a service associated with facility management system 140, and/or other types of requests. Furthermore, user interface 510 may generate notifications when a message has been received from facility management system 140 and may output the received message via user interface 330.

Key card interface 520 may communicate with smart key card 110. For example, key card interface 520 may convert messages received by message processor 530 into wireless signals to be transmitted by antenna assembly 350 to smart key card 110, and/or may receive wireless signals from smart key card 110 via antenna assembly 350 and convert the wireless signals into messages to be processed by message processor 530. Key card interface 520 may use a Bluetooth transceiver, an NFC wireless transceiver, and/or another type of transceiver of communication interface 340.

Message processor 530 may process user messages and/or requests. As an example, message processor 530 may receive user input received via user interface 510, may generate a message based on the user input, may authorize the message with smart key card 110 using key card interface 520, and may provide the message to facility management system interface 550 for transmission. As another example, message processor 530 may receive a selection of a request stored in requests memory 540 via user interface 510, may generate a message based on the selection, may authorize the message with smart key card 110 using key card interface 520, and may provide the message to facility management system interface 550 for transmission.

Requests memory 540 may store one or more requests that may be selected by a user using user interface 510. For example, requests memory 540 may store a request to contact a person on duty associated with a facility, a request to control a device associated with smart key card 110 (e.g., a thermostat), a request to obtain particular content (e.g., a map of a conference center, a discount code, etc.), a request to contact a particular service (e.g., housekeeping services, a concierge service, a valet service, a taxi service, etc.), a request to dial a particular phone number, and/or other types of requests.

Facility management system interface 550 may enable communication with facility management system 140. Facility management system interface 550 may convert messages received by message processor 530 into wireless signals to be transmitted by antenna assembly 350 to facility management system 140, and/or may receive wireless signals from facility management system 140 via antenna assembly 350 and convert the wireless signals into messages to be processed by message processor 530. As another example, facility management system interface 550 may convert messages into a format associated with a particular communication service and/or may receive messages in the particular format. For example, facility management system interface 550 may convert user input into a Short Message Service (SMS) message and may send the SMS message to facility management system 140.

Although FIG. 5 shows exemplary functional components of smart key card application 500, in other implementations, smart key card application 500 may include fewer functional components, different functional components, differently arranged functional components, or additional functional components than depicted in FIG. 5. Additionally or alternatively, one or more functional components of smart key card application 500 may perform functions described as being performed by one or more other functional components of smart key card application 500.

Figure 6:
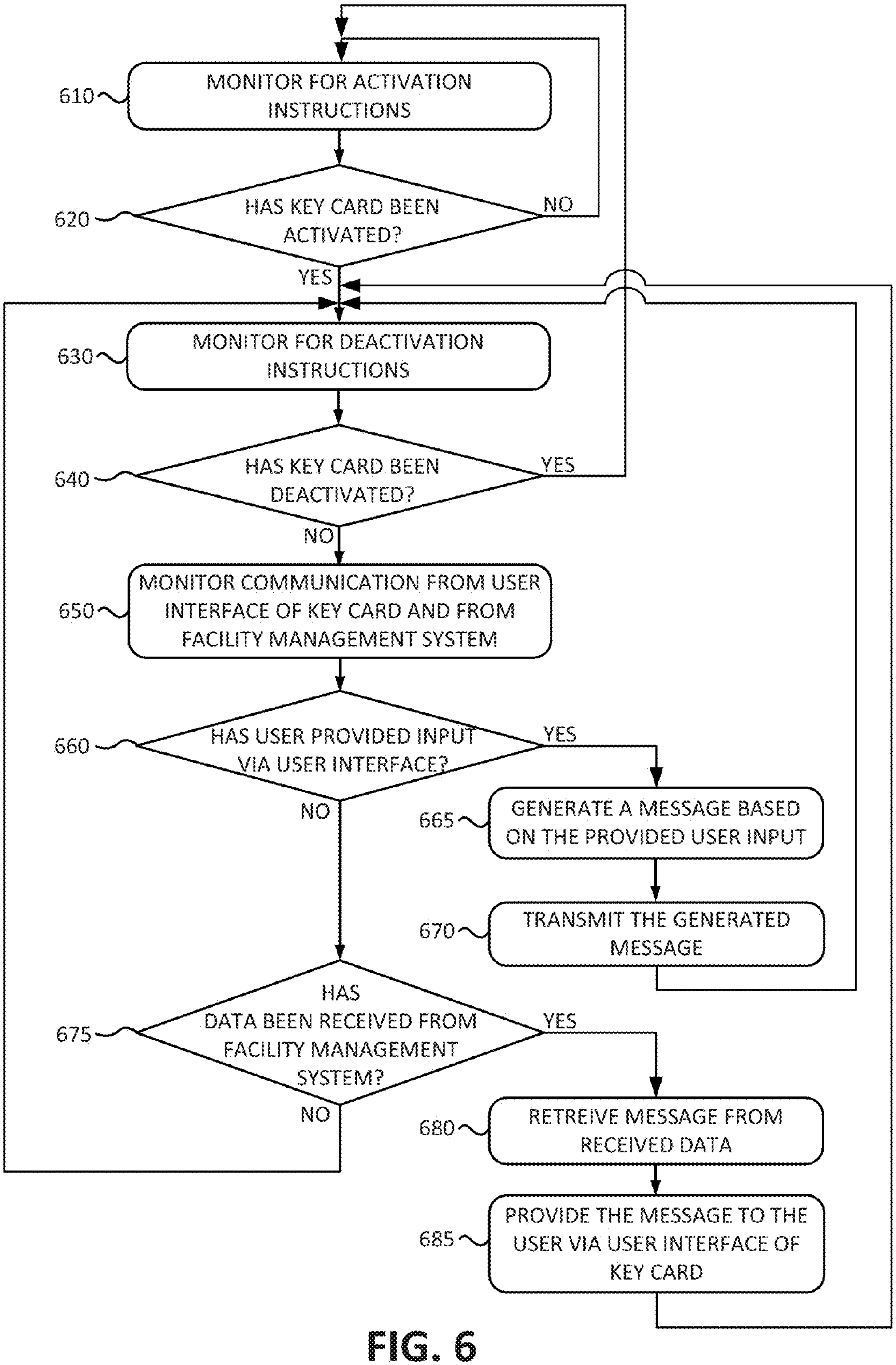
FIG. 6 is a flowchart of an exemplary process for sending or receiving messages using a smart key card according to an implementation described herein.

FIG. 6 is a flowchart of an exemplary process for sending or receiving messages using a smart key card according to an implementation described herein. In one implementation, the process of FIG. 6 may be performed by smart key card 110. In other implementations, some or all of the process of FIG. 6 may be performed by another device or a group of devices separate from smart key card 110 and/or including smart key card 110.

The process of FIG. 6 may include monitoring for activation instructions (block 610) and determining whether the key card has been activated (block 620). For example, smart key card 110 may be activated when a user is given smart key card 110 (e.g., when the user checks into a room at a hotel). Authentication and authorization manager 430 may monitor facility management system interface 460 for activation instructions. In some implementations, the activation instructions may be authenticated using a public key and private key authentication procedure. If the key card has not been activated (block 620—NO), processing may return to block 610 to monitor for activation instructions.

If the key card has been activated (block 620—YES), monitoring for deactivation instructions may be initiated (block 630) and a determination may be made as to whether the key card has been deactivated (block 640). For example, smart key card 110 may be deactivated when a user returns smart key card 110 (e.g., when the user check out of a room at a hotel). Authentication and authorization manager 430 may monitor facility management system interface 460 for deactivation instructions. If the key card has been deactivated (block 640—YES), processing may return to block 610 to monitor for activation instructions.

If the key card has not been deactivated (block 640—NO), monitoring for communication from a user interface of the key card, and from a facility management system, may be performed (block 650). For example, message processor 440 may monitor user interface 410 for user input, or user selection of requests from requests memory 450, and may monitor for messages received from facility management system 140 via facility management system interface 460.

A determination may be made as to whether the user has provided input via a user interface (block 660). If user input has been received via the user interface (block 660—YES), a message may be generated based on the provided input (block 665) and the generated message may be transmitted (block 670). For example, the user may enter input using keyboard 230 or may select a request from a menu of available requests stored in requests memory 450. As an example, the user may type out a request and send the request to a person on duty associated with facility management system 140 (e.g., a housekeeping request to a front desk of a hotel). Smart key card 110 may send the request as an SMS message, as an instant messaging chat message, or as a message using another communication method. As another example, the user may select a request to contact the person on duty from a menu of requests and smart key card 110 may dial a telephone number associated with the person on duty. The user may then communicate with the person on duty, using voice communication via microphone 274 and speaker 276.

As another example, a user may select to control a device associated with smart key card 110. For example, a user may select a request, from a menu of requests, to adjust the room temperature of a room associated with smart key card 110. The user may select a particular room temperature and smart key card 110 may send an instruction to facility management system 140 to adjust the thermostat of the user's room.

As another example, a user may request particular content from facility management system 140. For example, the user may request directions to the facility from the location of smart key card 110, may request a schedule of events associated with the facility, may request a list of available products or services, etc.

As yet another example, a user may request to contact a service associated with the facility. For example, the user may send a request to a taxi service, a concierge service, a roadside assistance service, etc. As yet another example, the user may request to dial a particular phone number. For example, the user may be able to use smart key card 110 as a mobile telephone and may use keyboard 230 to enter a telephone number. Telephone calls may be provided as part of the service associated with smart key card 110 or may be charged to the user's account.

After a message has been processed, processing may return to block 630 to monitor for deactivation instructions. Returning to block 660, if user input has not been received (block 660—NO), a determination may be made as to whether data has been received from the facility management system (block 675). If data has been received from the facility management system (block 675—YES), a message may be retrieved from the received data (block 680) and the message may be provided to the user via the user interface of the key card (block 685). For example, facility management system 140 may send an alert to smart key card 110 (e.g., an alert regarding a free happy hour or a meal, an alert regarding a problem at or near the facility, etc.), may send a reminder to smart key card 110, may forward a message to smart key card 110, etc.

After a message received from facility management system 140 has been processed, processing may return to block 630 to monitor for deactivation instructions. If data has not been received from the facility management system (block 675—NO), processing may also return to block 630 to monitor for deactivation instructions.

In some implementations, messages and/or requests generated by a user may be authorized before being processed using authentication and authorization manager 430 and policy memory 435. For example, a user may select a request from a menu of available requests stored in requests memory 450 and the request may not be available for the type of service available to the user. For example, a hotel customer reward program may include a free taxi service and the user of smart key card 110 may not be participating in the hotel customer reward program. Thus, if the user selects an unavailable request, the request may be denied by authentication and authorization manager 430.

Figure 7:
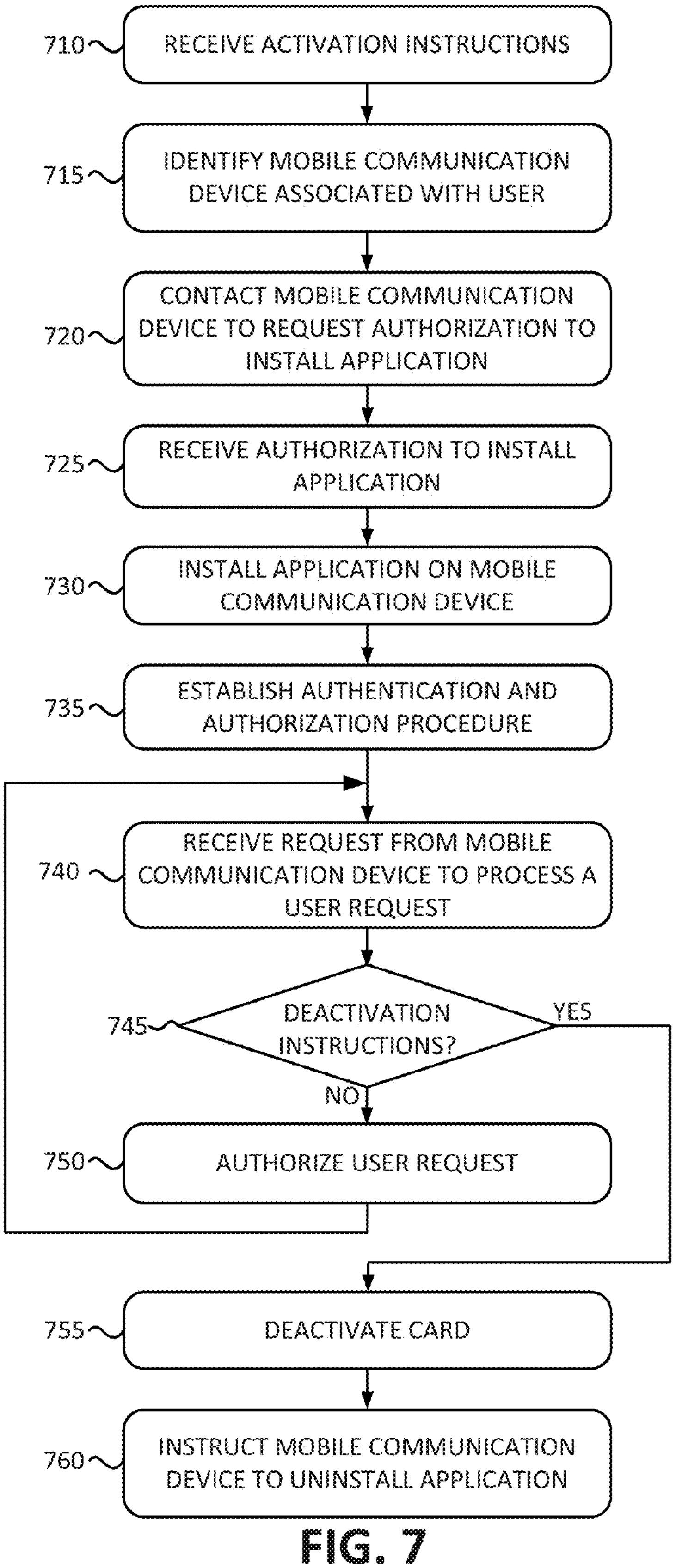
FIG. 7 is a flowchart of an exemplary process for a smart card interacting with a mobile communication device according to an implementation described herein.

FIG. 7 is a flowchart of an exemplary process for a smart card interacting with a mobile communication device according to an implementation described herein. In one implementation, the process of FIG. 7 may be performed by smart key card 110. In other implementations, some or all of the process of FIG. 7 may be performed by another device or a group of devices separate from smart key card 110 and/or including smart key card 110.

The process of FIG. 7 may include receiving activation instructions (block 710). For example, smart key card 110 may receive activation instructions from facility management system 140 via antenna 278. A mobile communication device associated with a user may be identified (block 715). For example, the activation instructions may include identification information associated with the user's mobile communication device 120, such as mobile device identifier. The mobile device identifier may include, for example, a Mobile Telephone Number (MTN), a Mobile Subscriber Integrated Services Digital Network number (MSISDN), an International Mobile Subscriber Identity (IMSI) number, a mobile identification number (MIN), an Integrated Circuit Card Identifier (ICCI), an Electronic Serial Number (ESN), an International Mobile Equipment Identifier (IMEI), a Subscriber Identity Module (SIM) identifier, and/or any other mobile communication device identifier.

The mobile communication device may be contacted to request authorization to install an application (block 720). For example, smart key card 110 may use a short range communication method, such as Bluetooth or NFC, to contact the identified mobile communication device 120 and may generate a user interface that requests authorization from the user of mobile communication device 120 to install key card application 500.

The authorization to install the application may be received (block 725) and the application may be installed on the mobile communication device (block 730). For example, the user may authorize the installation of key card application 500 and key card application 500 may be installed. In some implementations, key card application 500 may be stored on smart key card 110 and provided to mobile communication device 120 by smart key card 110. In other implementations, smart key card 110 may provide a URI to mobile communication device 120 and mobile communication device 120 may download key card application 500 using the provided URI.

An authentication and authorization procedure may be established (block 735). For example, smart key card 110 may provide a private key to mobile communication device 110 and may use a stored public key to authenticate that a message was received from mobile communication device 120. Furthermore, smart key card 110 may assign a particular policy to mobile communication device 120. The particular policy, stored in policy memory 435, may include a list of commands and/or requests that are permitted to be sent by key card application 500. The particular policy may be selected, for example, by facility management system 140 when smart key card 110 is activated.

A request from the mobile communication device may be received to process a user request (block 740). For example, the user may use key card application 500 to select a request and key card application 500 may attempt to authorize the request with smart key card 110 by sending an authorization request to smart key card 110. A determination may be made as to whether deactivation instructions have been received (block 750). For example, authentication and authorization manager 430 may monitor facility management system interface 460 for deactivation instructions.

If deactivation instructions have not been received (block 745—NO), the user request may be authorized (block 750). For example, authentication and authorization manager 430 may determine whether the request that is to be authorized is included in the policy associated with key card application 500. For example, the policy may include access to a taxi service at a discounted rate, access to a free shuttle to the airport, access to stream media content from a particular media provider, access to discount coupons for particular vendors and/or services, etc. Furthermore, in some implementations, smart key card 110 may function as a WiFi access point for mobile communication device 120. For example, smart key card 110 may establish a WiFi connection with facility management system 140, while at the facility or in the vicinity of the facility, and may provide a WiFi connection between mobile communication device 120 and facility management system 140. If the request is not included in the policy, the request may be rejected. If the request is included in the policy, the request may be authorized. For example, smart key card 110 may send an authorization message to key card application 500. Processing may return to block 740 and smart key card 110 may monitor for further authorization requests.

If deactivation instructions have been received (block 745—YES), the card may be deactivated (block 755) and the mobile communication device may be instructed to uninstall the application (block 760). For example, authentication and authorization manager 430 may deactivate smart key card 110, may ignore further authorization requests from key card application 500, and may instruct mobile communication device 120 to uninstall key card application 500.

Figure 8:
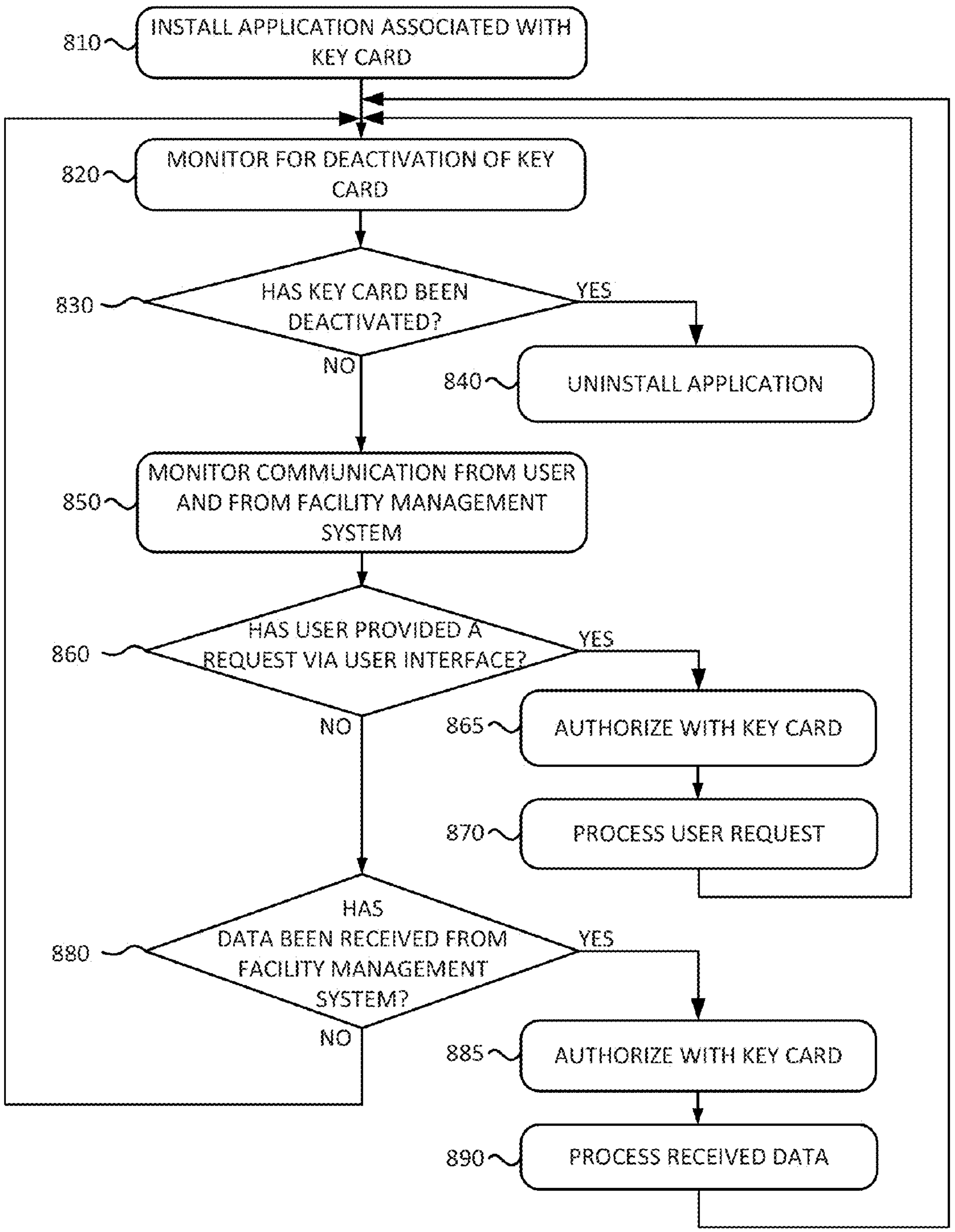
FIG. 8 is a flowchart of an exemplary process for sending or receiving messages using a mobile communication device in connection with a smart key card according to an implementation described herein.

FIG. 8 is a flowchart of an exemplary process sending or receiving messages using a mobile communication device in connection with a smart key card according to an implementation described herein. In one implementation, the process of FIG. 8 may be performed by mobile communication device 120. In other implementations, some or all of the process of FIG. 8 may be performed by another device or a group of devices separate from mobile communication device 120 and/or including mobile communication device 120.

The process of FIG. 8 may include installing an application associated with a key card (block 810). For example, mobile communication device 120 may download key card application 500 from smart key card 110 or from a URI received from smart key card 110, or received from facility management system 140.

Processing may include monitoring for the deactivation of the key card (block 820) and a determination may be made whether the key card has been deactivated (block 830). If the key card has been deactivated (block 830—YES), the application may be uninstalled (block 840). For example, key card application 500 may monitor for instructions from smart key card 110 to uninstall key card application 500 and if uninstallation instructions are received from smart key card 110, key card application 500 may uninstall itself or may be uninstalled by another component of mobile communication device 120.

Processing may include monitoring for communication from the user and from the facility management system (block 850). For example, message processor 530 may monitor user input via user interface 510 and may monitor for messages received via facility management system interface 550. A determination may be made as to whether the user has generated a request via a user interface (block 860). If user input has been received via the user interface (block 860—YES), the request may be authorized with the key card (block 865) and the user request may be processed (block 870) if the authorization is successful. For example, message processor 530 may send information about the request (e.g., similar to the requests described above with reference to FIG. 6) to smart key card 110 via key card interface 520, along with a request to authorize the request. Smart key card 110 may reply with an authorization message, enabling key card application 500 to process the request. After a request has been processed, processing may return to block 820 to monitor for deactivation instructions. Some user requests may be processed without authorization from smart key card 110. For example, a message to facility management system 140 indicating that the user has lost smart key card 110 may be sent without requiring authorization.

Returning to block 860, if user input has not been received via the user interface (block 860—NO), a determination may be made as to whether data has been received from the facility management system (block 880). If data has been received from the facility management system (block 860—NO), the data may be authorized with the key card (block 885) and the received data may be processed (block 890) if the authorization is successful. For example, message processor 530 may send information about the data to smart key card 110 via key card interface 520, along with a request to authorize the data. Smart key card 110 may reply with an authorization message, enabling key card application 500 to process the data. For example, user interface 510 may display a message based on the received data.

In some implementations, data received from facility management system 140 may not need to be authorized before being provided to the user. In other implementations, data received from facility management system 140 may need to be authorized. For example, facility management system 140 may send out an invitation to a VIP event. As another example, facility management system 140 may correspond to a conference center and the conference center may send out conference schedules for particular conference rooms. Only users associated with a particular conference room may be authorized to receive a conference schedule for the particular conference room.

After the data has been processed, processing may return to block 820 to monitor for deactivation instructions. If data has not been received from the facility management system (block 880—NO), processing may also return to block 820 to monitor for deactivation instructions.

Figure 9A:
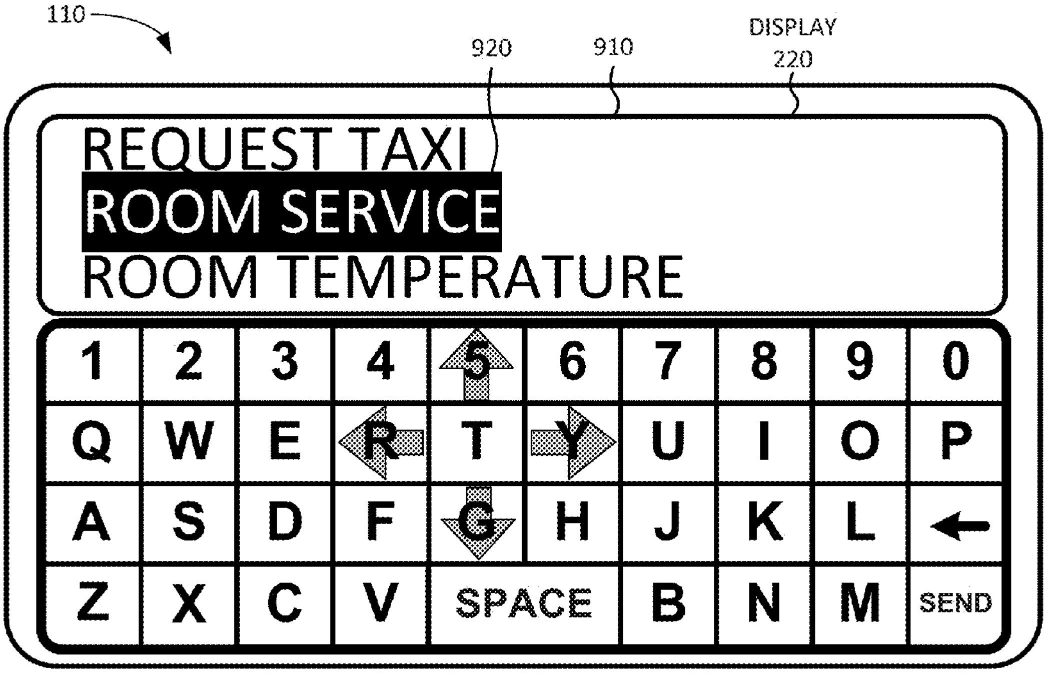
FIGS. 9A and 9B are diagrams of exemplary user interfaces of a smart key card according to an implementation described herein.
Figure 9B:
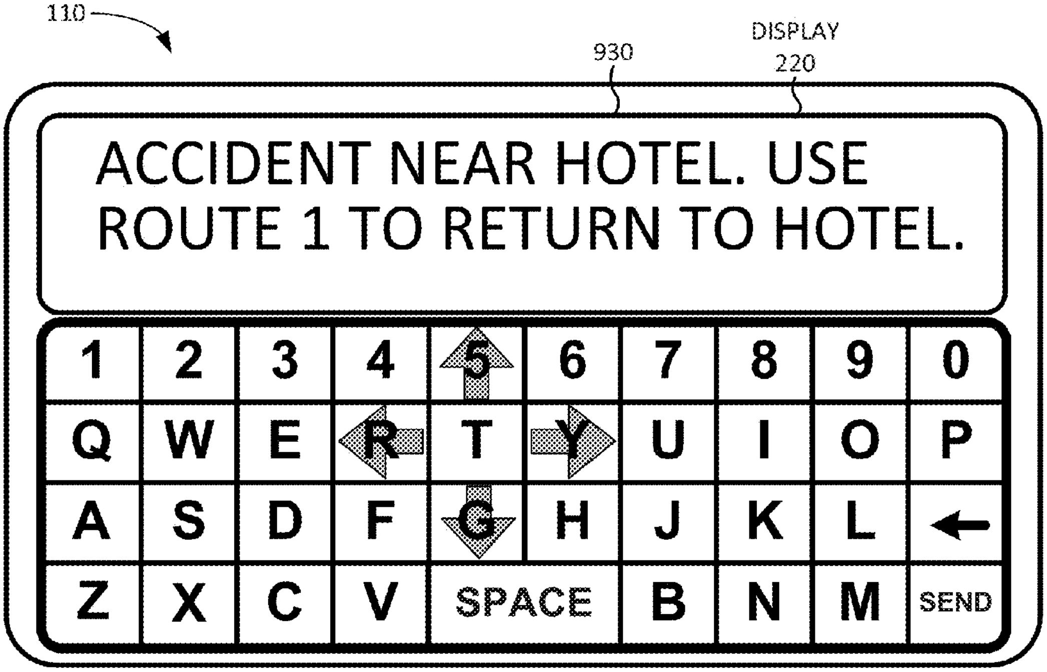

FIGS. 9A and 9B are diagrams of exemplary user interfaces of smart key card 110 according to an implementation described herein. FIG. 9A illustrates a user interface 910 that may be generated by display 220 in response to the user selecting to view a menu of requests that may be sent to facility management system 140 or to another device. User interface 910 may include a list 920 of requests, options, and/or commands that the user may send to facility management system 140 and/or to another device (e.g., a taxi dispatch service device). The user may select a request using keyboard 230 and smart key card 110 may execute the request. A confirmation that the request is being processed may be received by smart key card 110 and displayed in display 220.

FIG. 9B illustrates a user interface 930 that may be generated by display 220 in response to receiving a message from facility management system 140. Facility management system 140 may send messages at particular intervals, or in response to detecting a particular event. For example, facility management system 140 may send traffic information to smart key card 110. Smart key card 110 may alert the user that a message has been received by, for example, generating an audio signal using microphone 274 and may display the received message using user interface 930.

Figure 10A:
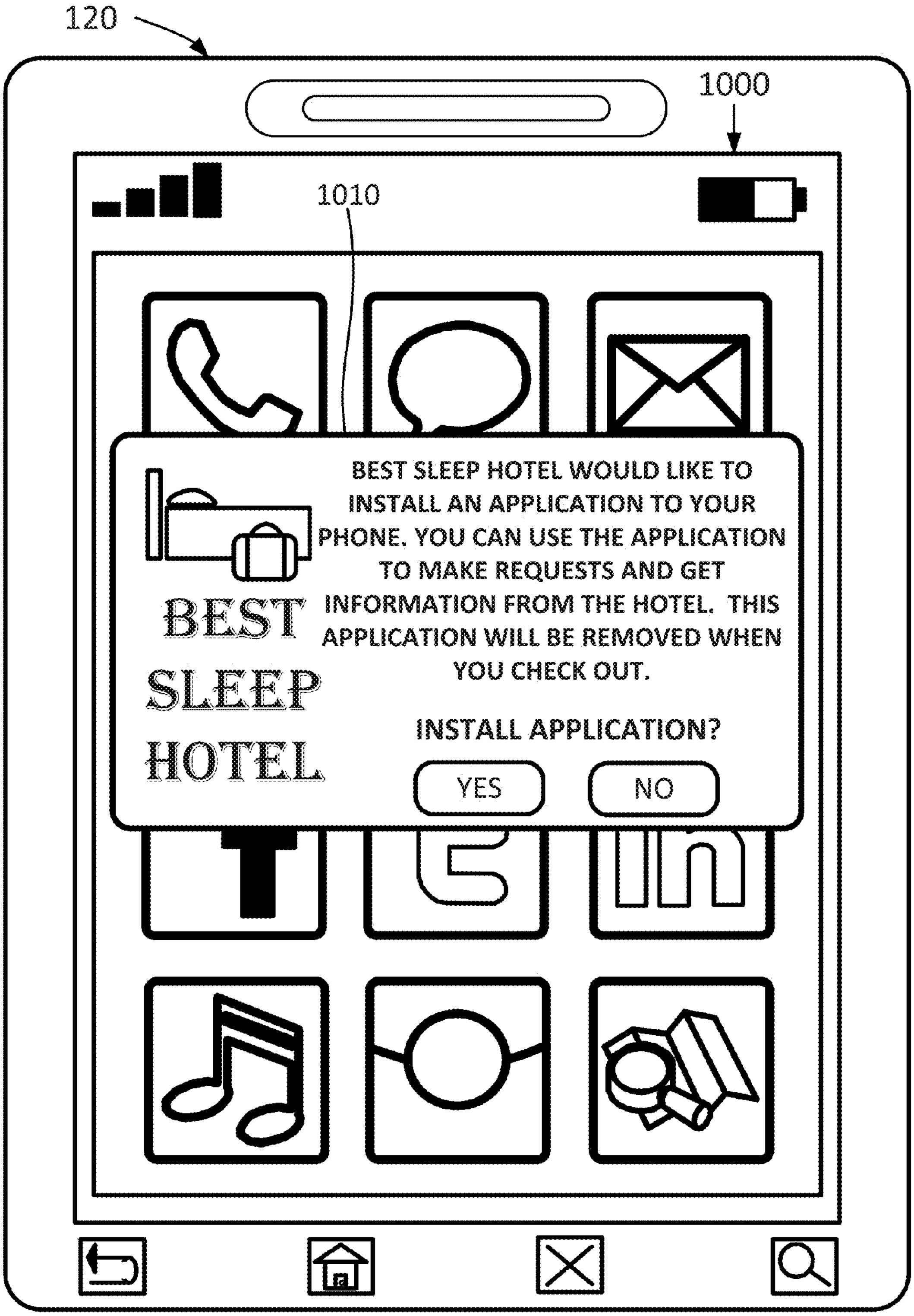
FIGS. 10A-10C are diagrams of exemplary user interfaces of a mobile communication device smart key card application.
Figure 10B:
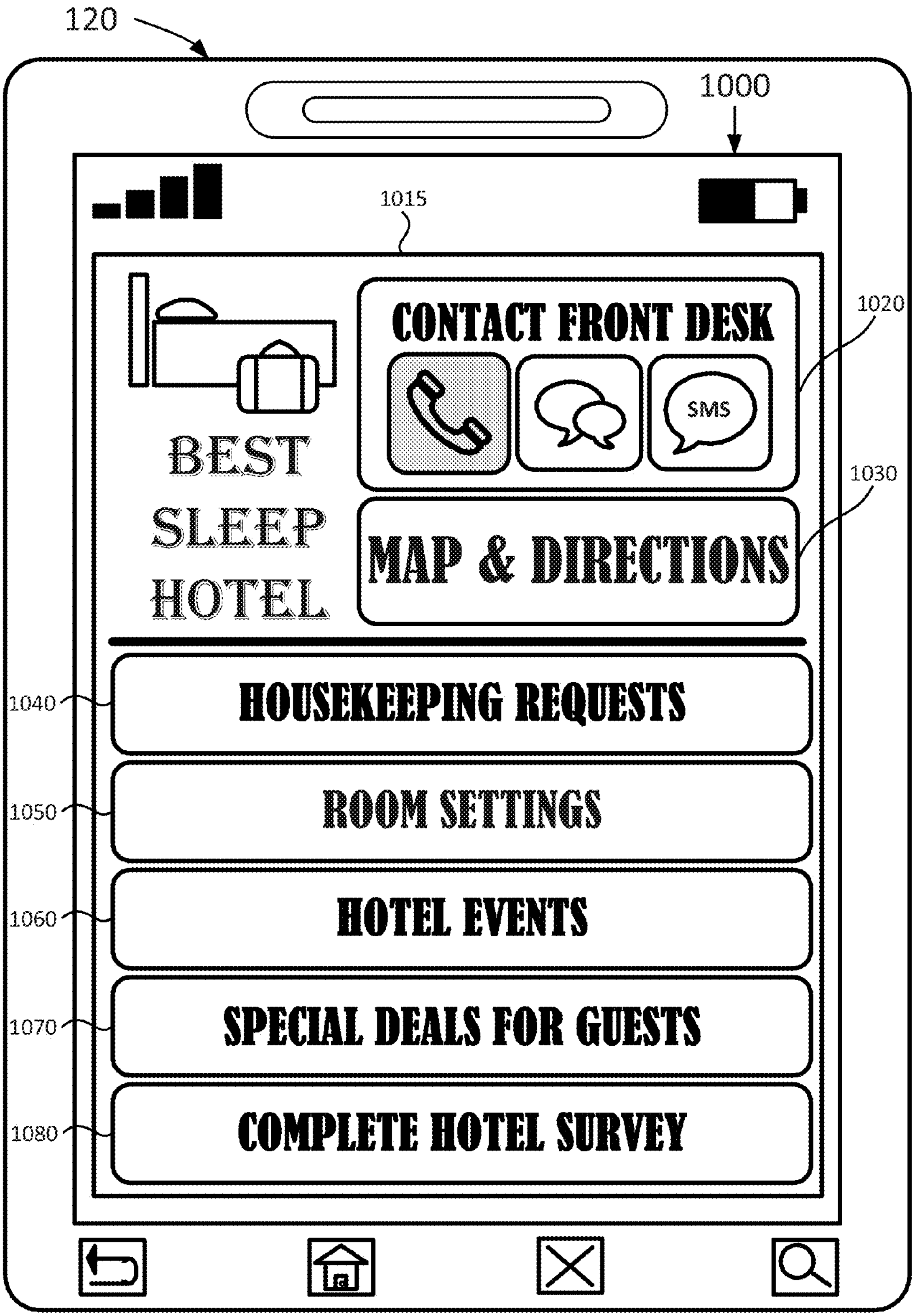
Figure 10C:
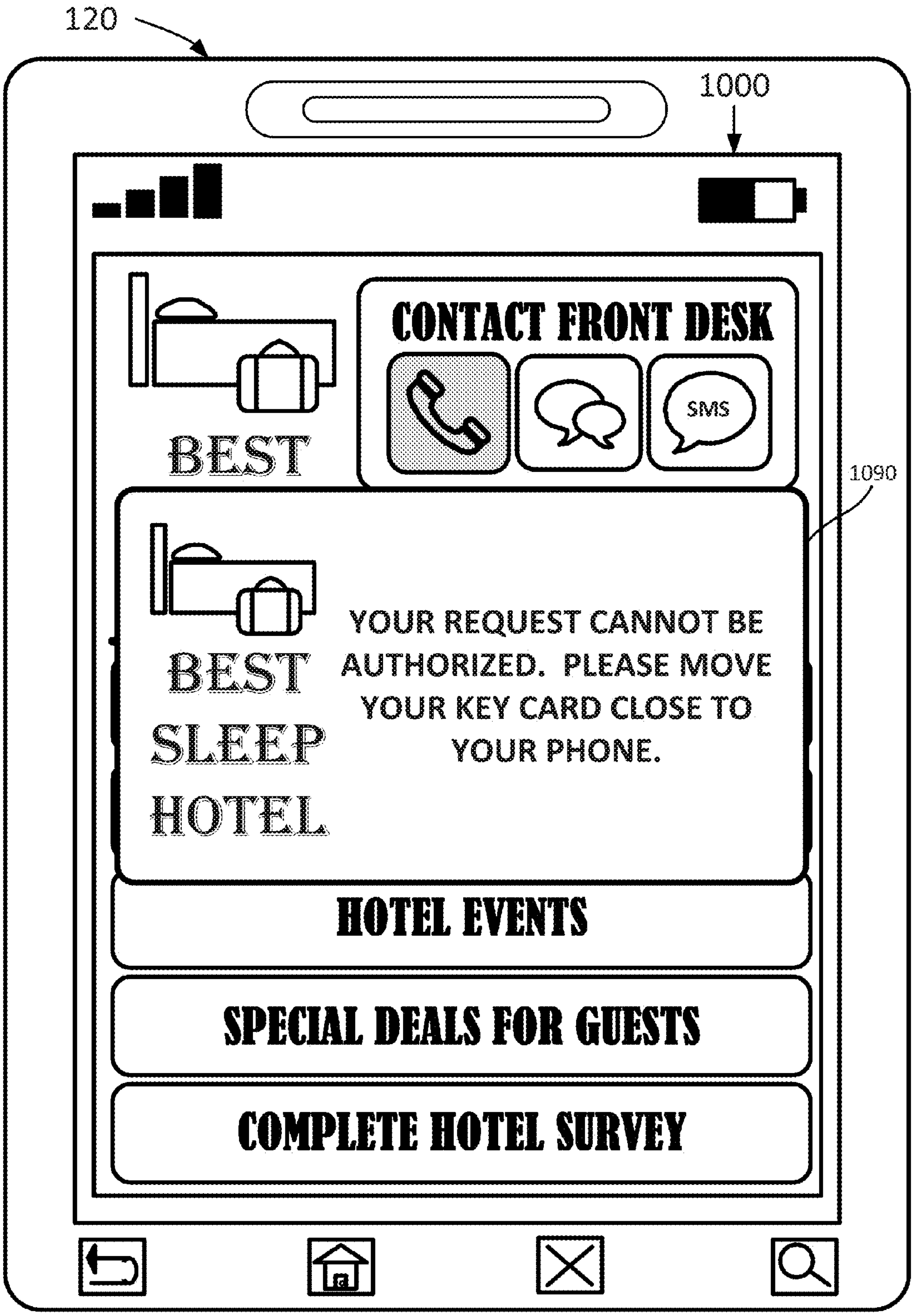

FIGS. 10A-10C are diagrams of exemplary user interfaces that may be generated in connection with key card application 500 for a hotel. FIG. 10A shows display 1000 of mobile communication device 120. Display 1000 may generate a notification 1010 to request authorization from the user to install key card application 500. In some implementations, notification 1010 may be generated by smart key card 110 and sent to mobile communication device 120 in response to smart key card 110 being activated. In other implementations, notification 1010 may be generated by facility management system 140 and sent to mobile communication device 120. If the user authorizes the installation of key card application 500, mobile communication device 120 may install key card application 500. After installation, key card application 500 may appear as an icon on the main screen of mobile communication device 120 and may be activated by the user by clicking on the icon.

FIG. 10B shows display 1000 with a user interface 1015 that may be generated by key card application 500 when a user activates a key card application 500 by, for example, clicking on an icon of key card application 500. As shown in FIG. 10B, user interface 1015 may include a front desk selection object 1020, a map and directions selection object 1030, a housekeeping requests selection object 1040, a room settings selection object 1050, a hotel events selection object 1060, a special deals selection object 1070, and a hotel survey selection object 1080.

Front desk selection object 1020 may enable a user to contact the front desk via a phone call, an instant messaging chat, or an SMS message. Map and directions selection object 1030 may enable the user to obtain a map and/or directions to the hotel. Housekeeping requests selection object 1040 may enable the user to access a menu with a list of common housekeeping requests that may be sent to the hotel staff. Room settings selection object 1050 may enable the user to access a menu of room settings, such as the room temperature, fan settings, etc. Hotel events selection object 1060 may provide information about events scheduled by the hotel. Special deals selection object 1070 may provide information about special deals that are available to the guests of the hotel. Hotel survey selection object 1080 may enable the user to fill out a hotel survey.

FIG. 10C shows display 1000 with a user interface 1090 that may be generated by key card application 500 when a user attempts to authorize a request and key card application 500 cannot establish communication with smart key card 110. The user may be instructed to move smart key card 110 closer to mobile communication device 120 in order to enable communication between mobile communication device 120 and smart key card 110.

Figure 11:
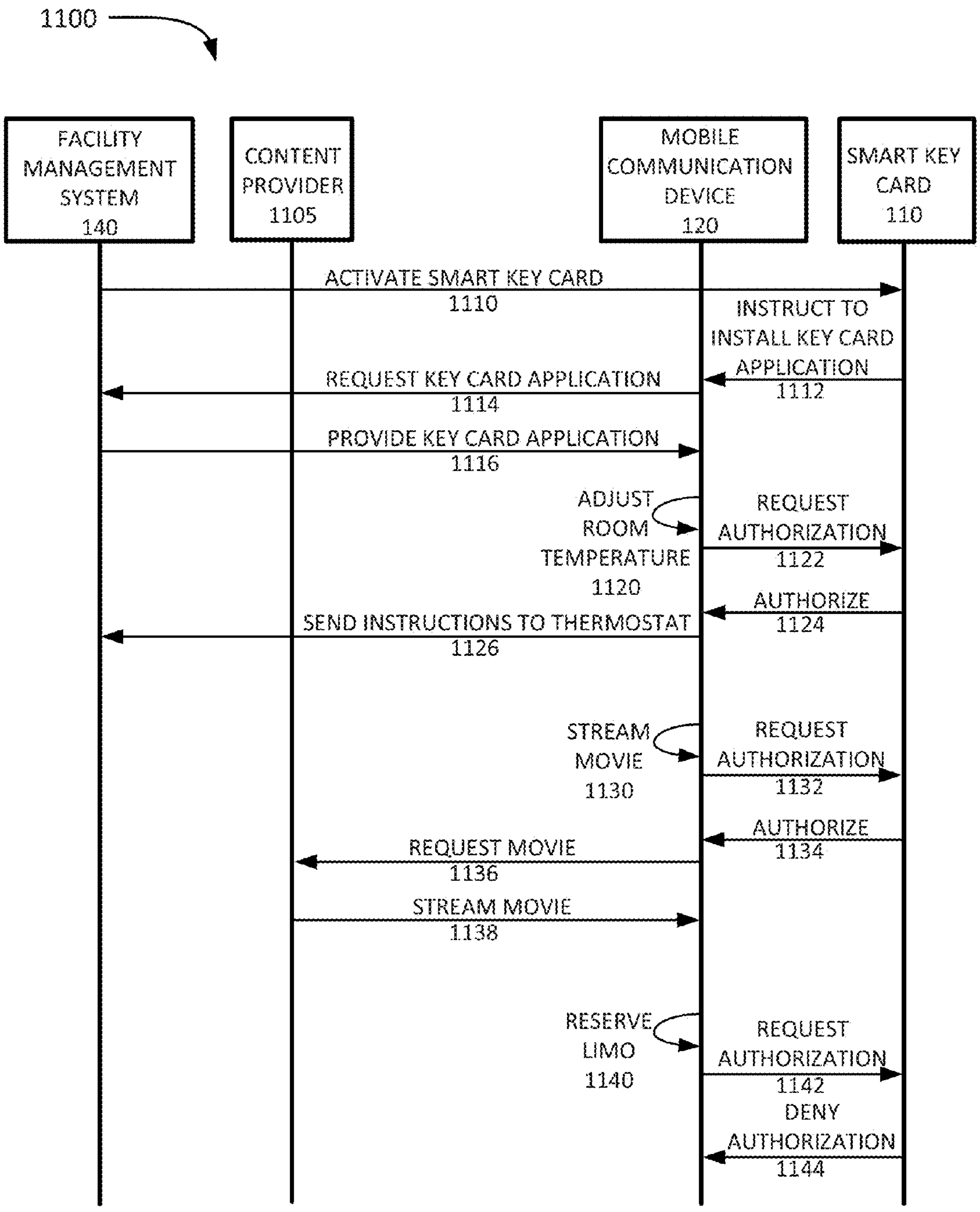
FIG. 11 is a diagram of an exemplary signal flow according to an implementation described herein.

FIG. 11 is a diagram of an exemplary signal flow 1100 according to an implementation described herein. In signal flow 1100, smart key card 110 may not include an input device or an output device. Instead, mobile communication device 120 may be used to send and receive requests and/or messages and smart key card 110 may be used to authorize the requests and/or messages.

Signal flow 1100 may include facility management system 140 activating smart key card 110 and providing to smart key card 110 information identifying mobile communication device 120 (signal 1110). Smart key card 110 may contact mobile communication device 120 and instruct mobile communication device 120 to install key card application 500 (signal 1112). Mobile communication device 120 may obtain key card application 500 from facility management system 140 and may install key card application 500 (signals 1114 and 1116).

The user may use key card application 500 to adjust the room temperature in the user's room (signal 1120). Key card application 500 may request an authorization for the request from smart key card 110 and smart key card 110 may authorize the request (signals 1122 and 1124). In response, key card application 500 may send an instruction to facility management system 140 to adjust the room temperature of the room associated with the user (signal 1126).

Guests of the hotel may be provided with a service to be able to stream content from a content provider 1105 to mobile communication device 120 while the users are guests of the hotel. For example, the user may be able to stream movies from a particular web site. The user may select to stream a movie (signal 1130). Key card application 500 may request an authorization for the request from smart key card 110 and smart key card 110 may authorize the request (signals 1132 and 1134). In response, key card application 500 may request to stream the movie from content provider 1105 and content provider 1105 may stream the movie to mobile communication device 120 (signals 1136 and 1138).

A user may request a limousine service using key card application 500 (signal 1140). However, this request may not be available to the user. Thus, key card application 500 may request an authorization for the request from smart key card 110 and smart key card 110 may deny the request (signals 1142 and 1144).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 6-8, and a signal flow has been described with respect to FIG. 11, the order of the blocks and/or signals may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A key card device comprising:

a memory device storing a digital signature for controlling at least one access mechanism;

a wireless transceiver; and logic configured to:

establish an authorization policy with a mobile communication device;

receive a request from the mobile communication device to authorize a user request via the wireless transceiver;

determine whether the key card device is activated;

determine whether the received request satisfies the established authorization policy; and authorize the received request via the wireless transceiver, in response to determining that the key card device is activated and in response to determining that the received request satisfies the established authorization policy.

2. The key card device of claim 1, wherein the logic is further configured to:

identify the mobile communication device as being associated with a user of the key card device;

request authorization from the mobile communication device to install a key card application on the mobile communication device;

receive the requested authorization from the mobile communication device; and install the key card application on the mobile communication device in response to receiving the requested authorization.

3. The key card device of claim 2, wherein the logic is further configured to:

receive a deactivation request from a facility management system, associated with the key card device, to deactivate the key card device;

deactivate the key card device in response to receiving the deactivation request; and uninstall the key card application from the mobile communication device in response to receiving the deactivation request.

4. The key card device of claim 1, wherein, when determining whether the received request satisfies the established authorization policy, the logic is further configured to:

determine whether the received request is included in a list of requests included in the authorization policy.

5. The key card device of claim 1, wherein the request includes streaming particular content to the mobile communication device.

6. The key card device of claim 1, wherein the request includes at least one of:

a request to contact a person on duty associated with a facility associated with the key card device;

a request to control a device associated with the key card device;

a request to obtain content associated with the facility; or a request to contact a service associated with the facility.

7. The key card device of claim 1, wherein the wireless transceiver includes at least one of:

a Bluetooth wireless transceiver; or a Near Field Communication transceiver.

8. A method, performed by a mobile communication device, the method comprising:

installing, by the mobile communication device, a key card application associated with a key card device;

receiving, by the mobile communication device, a user request via a user interface associated with the key card application;

sending, by the mobile communication device, an authorization request to the key card device to authorize the received user request;

receiving, by the mobile communication device, an authorization message from the key card device; and processing, by the mobile communication device, the user request in response to receiving the authorization message.

9. The method of claim 8, further comprising:

receiving data associated with the key card device;

sending an authorization request to the key card device to authorize the received data;

receiving an authorization of the received data from the key card device; and providing the received data to a user interface in response to receiving the authorization of the received data.

10. The method of claim 8, wherein the user request includes at least one of:

a request to contact a person on duty associated with a facility management system associated with the key card device;

a request to control a device associated with the key card device;

a request to obtain content associated with the facility management system;

a request to contact a service associated with the facility management system;

a request for directions to a facility associated with the key card device; or streaming particular content to the mobile communication device.

11. The method of claim 8, further comprising:

receiving an instruction from the key card device to uninstall the key card application; and uninstalling the key card application in response to receiving the instruction.

12. The method of claim 8, wherein the mobile communication device communicates with the key card device using at least one of:

a Bluetooth transceiver; or a Near Field Communication transceiver.

13. A mobile communication device comprising:

logic configured to:

install a key card application associated with a key card device;

receive a user request via a user interface associated with the key card application;

send an authorization request to the key card device to authorize the received user request;

receive an authorization message from the key card device; and process the user request in response to receiving the authorization message.

14. The mobile communication device of claim 13, wherein the logic is further configured to:

receive data associated with the key card device;

send an authorization request to the key card device to authorize the received data;

receive an authorization of the received data from the key card device; and provide the received data to a user interface in response to receiving the authorization of the received data.

15. The mobile communication device of claim 13, wherein the user request includes at least one of:

a request to contact a person on duty associated with a facility management system associated with the key card device;

a request to control a device associated with the key card device;

a request to obtain content associated with the facility management system;

a request to contact a service associated with the facility management system;

a request for directions to a facility associated with the key card device; or streaming particular content to the mobile communication device.

16. The mobile communication device of claim 13, wherein the logic is further configured to:

receive an instruction from the key card device to uninstall the key card application; and uninstall the key card application in response to receiving the instruction.

17. The mobile communication device of claim 13, wherein the mobile communication device communicates with the key card device using at least one of:

a Bluetooth transceiver; or a Near Field Communication transceiver.

* * * * *